US011442497B1

(12) United States Patent
Gregory

(10) Patent No.: US 11,442,497 B1
(45) Date of Patent: Sep. 13, 2022

(54) MISSION ELAPSED TIME UNIT

(71) Applicant: United States of America as represented by the Administrator of NASA, Washington, DC (US)

(72) Inventor: Kyle Gregory, Adelphi, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 102 days.

(21) Appl. No.: 16/919,158

(22) Filed: Jul. 2, 2020

(51) Int. Cl.
- *G06F 1/10* (2006.01)
- *G06F 1/12* (2006.01)
- *G06F 1/14* (2006.01)
- *G06F 9/30* (2018.01)

(52) U.S. Cl.
CPC .............. *G06F 1/14* (2013.01); *G06F 1/10* (2013.01); *G06F 1/12* (2013.01); *G06F 9/30101* (2013.01); *G06F 9/30116* (2013.01)

(58) Field of Classification Search
CPC ................. G06F 1/10; G06F 1/12; G06F 1/14
See application file for complete search history.

(56) References Cited

U.S. PATENT DOCUMENTS

| | | | | |
|---|---|---|---|---|
| 2010/0100762 | A1* | 4/2010 | Carlson | H04J 3/0641 714/4.1 |
| 2011/0185214 | A1* | 7/2011 | Luskind | G04R 20/06 713/375 |
| 2012/0079310 | A1* | 3/2012 | Matsusue | G06F 1/14 713/400 |
| 2021/0072401 | A1* | 3/2021 | Colli-Vignarelli | G01S 19/258 |
| 2021/0157355 | A1* | 5/2021 | Sarda | G06F 1/12 |

OTHER PUBLICATIONS

Raphael, David, et al. "Timekeeping for the Space Technology 5 Mission", 2003 IEEE Aerospace Conference Proceedings, Mar. 8-15, 2003.*
Lau, Sen-Young, et al. "Fine-grained time synchronization for mission-critical DTSNs", 9th International Conference on Networked Sensing, 2012.*

* cited by examiner

*Primary Examiner* — Jaweed A Abbaszadeh
*Assistant Examiner* — Cheri L Harrington
(74) *Attorney, Agent, or Firm* — Christopher O. Edwards; Bryan A. Geurts; Helen M. Galus

(57) ABSTRACT

A mission elapsed time (MET) unit for using during outer space missions. The MET unit comprises a MET core, a crystal oscillator (XO) operably connected to the MET core, an external pulse per second (XPPS) source generating an XPPS input signal and operably connected to the MET core, a synchronization logic and a "Blackout Limit" register. Both the synchronization logic and the "Blackout Limit" register are arranged between the XPPS source and the MET core so that each of the synchronization logic and the "Blackout Limit" register is operably connected to both the XPPS source and the MET core. The MET core includes a sub-seconds counter keeping track of time over scales of less than one second and a seconds counter keeping track of time over scales of larger than one second.

2 Claims, 4 Drawing Sheets

MISSION ELAPSED TIME UNIT

BACKGROUND OF THE INVENTION

1. Field of the Invention

The present invention generally relates to time devices used during their space missions, and more particularly to a mission elapsed time (MET) unit for scheduling all events after launch of a space mission.

2. Description of the Prior Art

Typically, space vehicles, such as satellites and other space probes, are used to transport a payload, including astronauts, scientific instruments and other pieces of equipment to outer space. Mission Elapsed Time (MET) is used by NASA during their space missions, most notably during their Space Shuttle missions. Because so much of the mission depends on the time of launch, all events after launch are scheduled on the Mission Elapsed Time. This avoids constant rescheduling of events in case the launch time slips. The MET-timer (or clock) is set to zero at the moment of liftoff and counts forward in normal days, hours, minutes, and seconds. For example, 2/03:45:18 MET means it has been 2 days, 3 hours, 45 minutes, and 18 seconds since liftoff.

A spacecraft on orbit must synchronize its mission time periodically with that on the ground. A spacecraft may have intermittent communications contacts with the ground, and thus the clocks on the two entities may drift in between communications contacts.

A spacecraft on orbit, particularly a large one, may have multiple embedded computers, each of which needs to maintain its own knowledge of mission time and each of which needs to be maintained or synchronized relative to one another. Often a GPS system, if available, provides a "1PPS" (one pulse per second) signal to which other systems must synchronize. In other cases, an atomic clock may be used to generate a 1PPS signal for all of the systems to synchronize to. Generally speaking, all computers on a spacecraft use some sort of oscillator as a basic mechanism of operation, but also as a means of time keeping. Such oscillators are typically relatively un-precise (for example, 50 ppm accuracy is typical) and thus a computer's perception of time may drift slightly compared to reality.

An embedded system operating in a high reliability spacecraft on orbit must tolerate multiple failure modes. In particular, many computers must perform certain critical computations once per second, therefore, if the computer's timing is significantly shorter or longer than one second from the computer's perspective, then the computer will go into safe mode, which should be avoided if possible. First, the loss of a 1PPS signal must be tolerated. A glitch or abnormal behavior of the 1PPS signal causing the period of 1PPS to vary significantly from the computer's internal clock. Following a loss of ground contact, the spacecraft computer's clock must be re-synchronized with the time on the ground after the time may have drifted. It must be re-synchronized in a gradual/graceful manner. Any one of the embedded systems on a large spacecraft that are involved in time synchronization may fail at a given time and the other systems must continue operating normally in such a scenario.

There may be multiple redundant copies of embedded systems on a large, high-reliability system. Therefore, systems must be capable of synchronizing their time via any one of multiple sources. Moreover, embedded systems on a large spacecraft are often required to perform tasks with very predictable timing and with short response times. Therefore, a task such as synchronizing time, which is inherently very demanding in terms of responsivity, puts a strain on a system towards responding to other tasks in real time.

Alternatively, most modern operating systems support the Unix time (also known as Epoch time, POSIX time, seconds since the Epoch, or UNIX Epoch time). The Unix time is a system for describing a point in time. It is the number of seconds that have elapsed since the Unix epoch, that is, the time 00:00:00 UTC on 1 Jan. 1970, minus leap seconds, as opposed to launch time.

Therefore, while conventional MET timers have proven to be acceptable for space missions, improvements that may enhance their performance and cost are possible.

BRIEF SUMMARY OF THE INVENTION

According to a first aspect of the invention, there is provided a mission elapsed time (MET) unit for using during outer space missions. The MET unit comprises a MET core, a crystal oscillator (XO) operably connected to the MET core, an external pulse per second (XPPS) source generating an XPPS input signal and operably connected to the MET core, a synchronization logic and a "Blackout Limit" register. Both the synchronization logic and the "Blackout Limit" register are arranged between the XPPS source and the MET core so that each of the synchronization logic and the "Blackout Limit" register is operably connected to both the XPPS source and the MET core. The MET core includes a sub-seconds counter keeping track of time over scales of less than one second and a seconds counter keeping track of time over scales of larger than one second.

According to a second aspect of the present invention, there is provided a method for synchronization of an output of a mission elapsed time (MET) core to an external pulse per second (XPPS) input signal. The MET core includes a sub-seconds counter keeping track of time over scales of less than one second and a seconds counter keeping track of time over scales of larger than one second. The sub-seconds counter is operably connected to the seconds counter. The XPPS input signal is generated by a XPPS source operably connected to the MET core. The method involves the steps of powering up or resetting the XPPS input signal, determining how far apart are two one-second boundaries of the MET core, determining a period of the XPPS input signal, enabling first synchronization to the XPPS input signal using a status register, adjusting a freewheel limit higher or lower to achieve an acceptable drift rate of the one-second boundaries of the MET core toward the XPPS input signal and setting a blackout limit lower than the freewheel limit with enough margin to ensure that the XPPS pulse is captured.

According to a third aspect of the invention, there is provided an integrated circuit including a mission elapsed time (MET) unit for using during outer space missions. The MET unit comprises a MET core, a crystal oscillator (XO) operably connected to the MET core, an external pulse per second (XPPS) source generating an XPPS input signal and operably connected to the MET core, a synchronization logic and a "Blackout Limit" register. Both the synchronization logic and the "Blackout Limit" register are arranged between the XPPS source and the MET core so that each of the synchronization logic and the "Blackout Limit" register is operably connected to both the XPPS source and the MET core. The MET core includes a sub-seconds counter keeping track of time over scales of less than one second and a seconds counter keeping track of time over scales of larger than one second.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
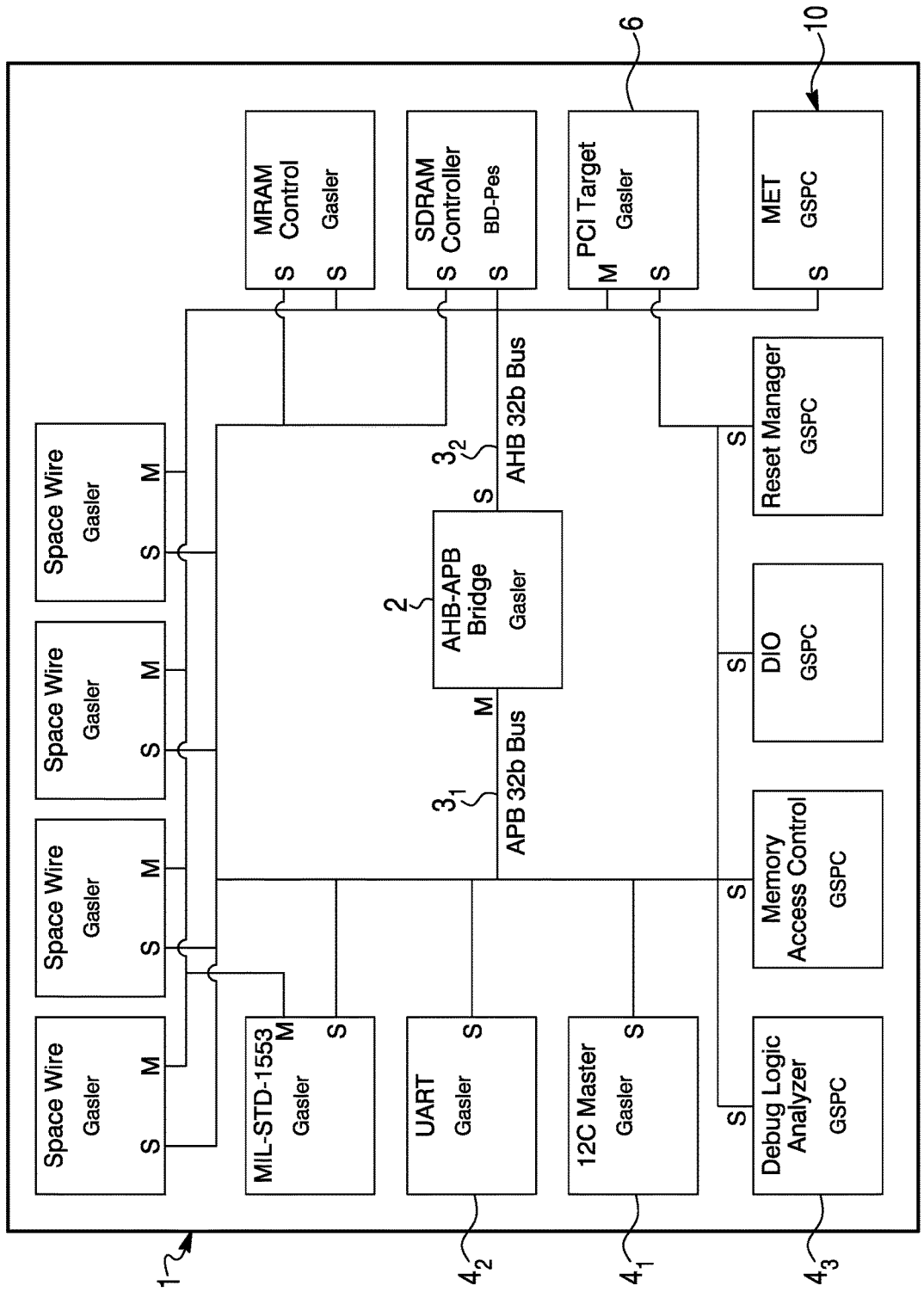
FIG. 1 is a communication diagram for a Field Programmable Gate Array (FPGA) of a WFIRST processor card.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operably connected" is such an attachment, coupling or connection that allows the pertinent structures to operate as intended by virtue of that relationship. Additionally, the word "a" and "an" as used in the claims means "at least one" and the word "two" as used in the claims means "at least two".

FIG. 1 shows an exemplary embodiment of a top-level communication diagram of a FPGA generally denoted by a reference character 1. FPGAs are known in the art as field-programmable gate arrays (FPGAs)—integrated circuits designed to be configured by a customer or a designer after manufacturing—hence the term "field-programmable". The FPGAs contain an array of programmable logic blocks, and a hierarchy of "reconfigurable interconnects" that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory. Many FPGAs can be reprogrammed to implement different logic functions, allowing flexible reconfigurable computing as performed in computer software. The FPGA of the exemplary embodiment is a RTG4—a radiation-tolerant high-density high-performance flash-based FPGA by Microsemi Corporation.

The purpose of the FPGA 1 is to provide I/O, peripheral, and memory expansion for a WFIRST processor card (WPC). The WFIRST is a Wide-Field Infrared Survey Telescope. The FPGA architecture is built on an Advanced Microcontroller Bus Architecture (AMBA) architecture from an Advanced RISC Machine (ARM), utilizing AHB (Advanced High-performance Bus) and APB (Advanced Peripheral Bus) bus protocols. This architecture enables both efficient and flexible use of peripherals and data transfer.

Specifically, the FPGA 1 comprises an AHB-APB Bridge 2 electrically connected to both an APB 32-bit bus $3_1$ and an AHB bus $3_2$. The APB bus $3_1$ is a basic bus architecture that supports a single APB master and multiple slaves. In the exemplary embodiment, the APB master is in the form of the AHB-APB Bridge 2, while components, such as an Inter-Integrated Circuit (I2C or IIC) master component $4_1$, a Universal Asynchronous Receiver-Transmitter (UART) $4_2$, and a Debug Logic Analyzer $4_3$, are the slaves. Each slave is allocated a region of an address space on the bus $3_1$, and flow control signals between the slaves and the APB master 2 assure reliable data transfer between the slaves and the APB master 2. The AHB bus $3_2$ is a more powerful bus architecture. AHB bus $3_2$ enables multiple masters and slaves to share the bus and provides arbitration between masters requesting bus access. In this implementation, arbitration is handled on a round-robin basis to ensure that all masters get an opportunity to use the bus. The AHB bus $3_2$ also supports burst transfers, enabling the AHB bus $3_2$ to provide higher throughput at the same clock speed compared with a standard APB bus. In this configuration, a PCI (Peripheral Component Interconnect) unit (or core) 6 is considered as a primary interface, in that it is the only interface that can start using the bus on power-up without first being configured by some other system on the bus. The PCI unit 6 acts as a master on the AHB bus $3_2$. Therefore, any read or write requests to a PCI memory space are translated into AHB transactions. The other AHB masters are simple Direct Memory Access (DMA) engines that will move data to and from a memory space as instructed. There is also a UART (Universal Asynchronous Receiver/Transmitter)-based debug port that has all of the capabilities of the PCI interface, except with significantly lesser throughput.

As illustrated in FIG. 1, the FPGA 1 comprises a mission elapsed time (MET) unit (or timer) 10. In other words, the MET unit 10 is a part of an integrated circuit, such as the FPGA 1, possibly as part of a processor or microcontroller.

The MET unit 10 comprises a MET core 11, an on-board oscillator 16, such as a crystal oscillator (XO), and an optional XPPS (External Pulse Per Second) source, such as an Ultra-Stable Oscillator (USO) 18. It should be understood that various types of the crystal oscillator may be used, including but not limited to a temperature-compensated crystal oscillator (TCXO) and an oven-controlled crystal oscillator (OCXO). Alternatively, the on-board oscillator 16 may be in the form of a RC oscillator, piezoelectric oscillator, etc. Current ultra-stable oscillator (USO) technology relies on highly precise quartz resonators that are selected based on a desired output frequency and stability. The MET core 11 of the present invention keeps track of time by receiving input signals from the on-board crystal oscillator (XO) 16 and the optional One Pulse Per Second (1PPS) input (or input signal, or pulse) from the XPPS source 18.

The 1PPS input prevents timing drift, while the on-board crystal oscillator 16 is for fine-precision time counting and reliability. The MET core 11 accepts two XPPS inputs (or input signals, or input pulses) $19_1$ and $19_2$ so that either of two redundant systems can be used for time synchronization. The MET core 11 will continue to count time in the absence of the 1PPS signal using a method known in the art as "freewheeling". Primary outputs of the MET core 11 are a 64-bit MET value and a "1.x" output signal (or pulse) 30, which is a pulsed signal that is synchronized with MET seconds boundaries. Control is performed through a 32-bit AHB slave interface. Additionally, the MET time is provided on a separate output port so that it can be used directly by other cores in the FPGA for time-tagging interactions. Lastly, the MET core 11 generates several maskable interrupts that can be used for managing XPPS synchronization and scheduling software tasks.

Figure 2:
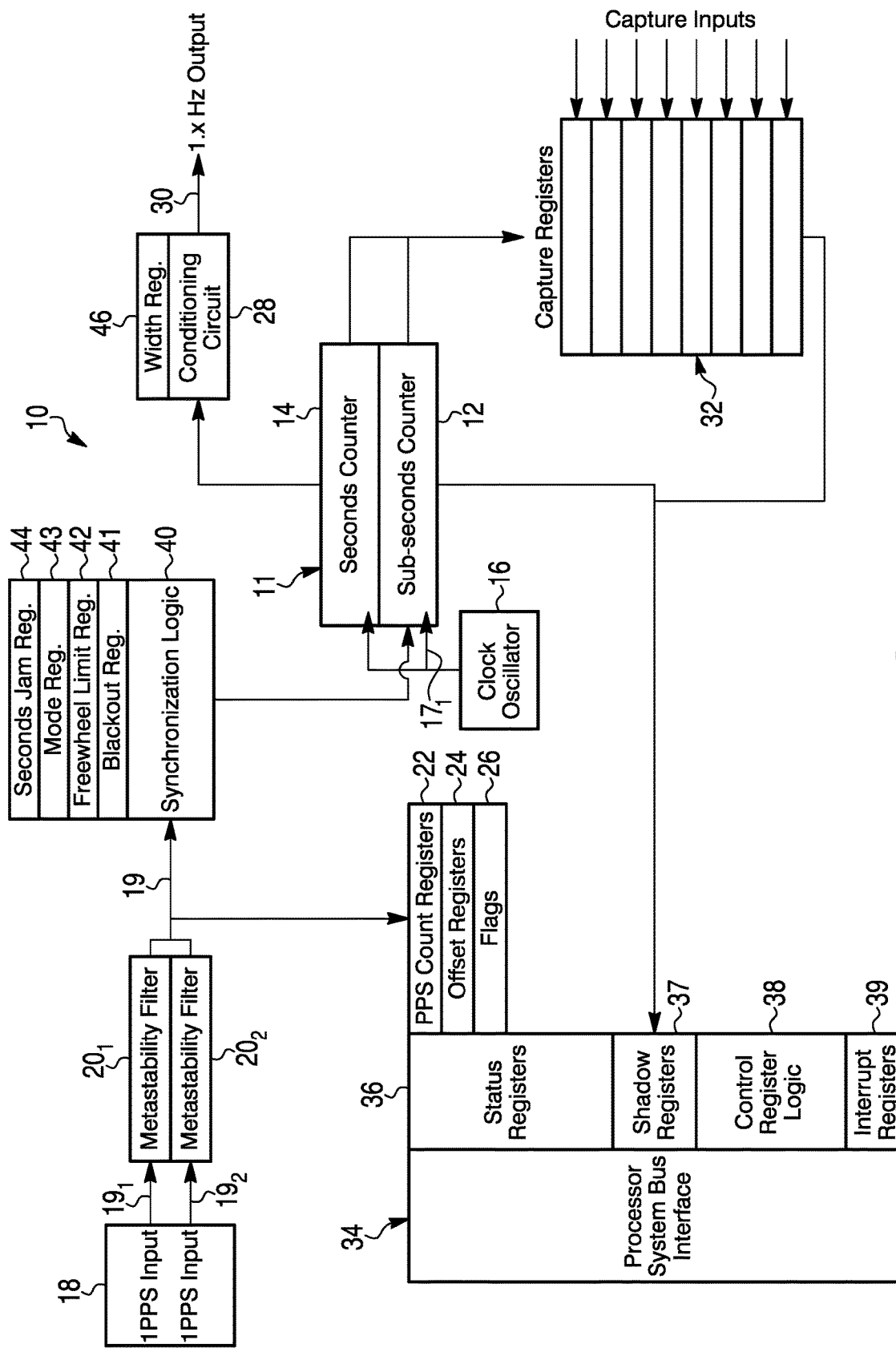
FIG. 2 is a block diagram of a Mission Elapsed Time (MET) unit.

According to the exemplary embodiment as best shown in FIG. 2, the MET core 11 comprises a first counter 12 and a second counter 14 to keep track of time, such as 4-bit synchronous binary counters SN74HC161 manufactured by Texas Instrument or the like. The first and second counters 12, 14 are electrically connected to one another. A counter is known in the art as a device which stores (and sometimes displays) the number of times a particular event or process has occurred, often in relationship to a clock. The most common type of counter is a sequential digital logic circuit with an input line and multiple output lines. The values on the output lines represent a number in the binary or BCD number system. Each pulse applied to the clock input increments or decrements the number in the counter. A counter circuit is usually constructed of a number of flip-flops connected in cascade. Counters are a very widely used component in digital circuits, and are manufactured as separate integrated circuits and also incorporated as parts of larger integrated circuits.

Figure 3:
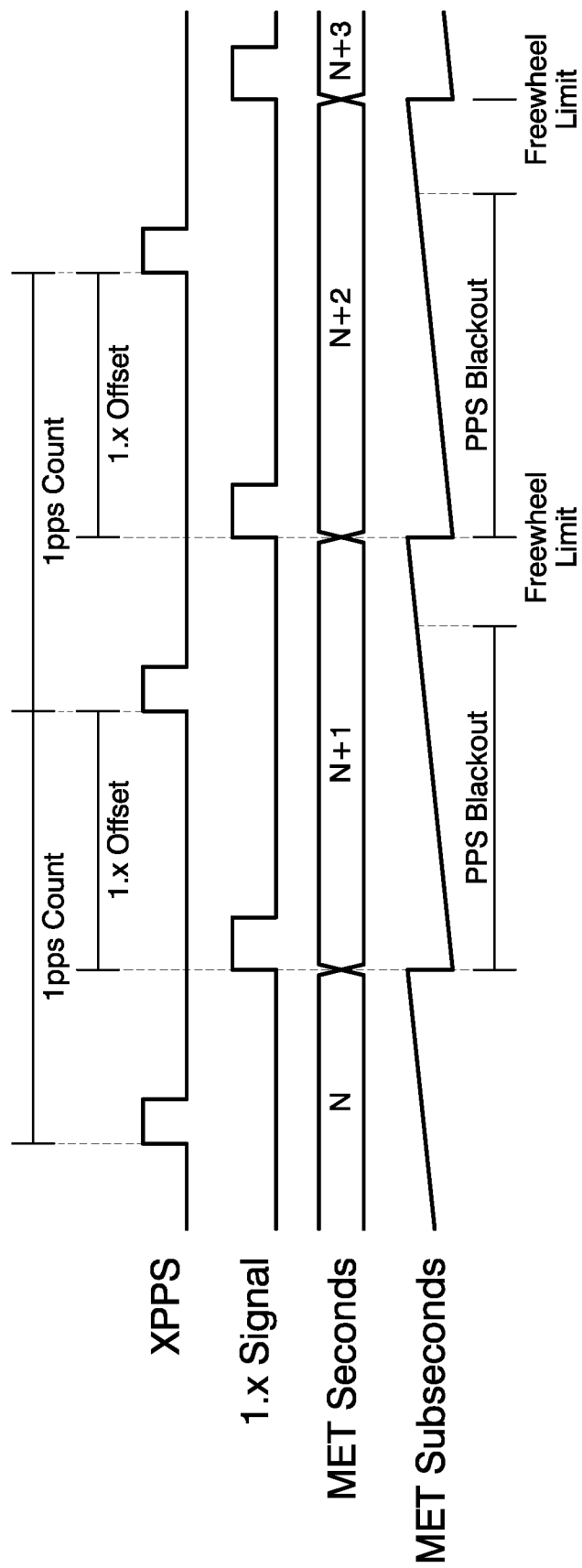
FIG. 3 is a timing diagram illustrating a nominal operating scenario for the MET unit while freewheeling.

The first counter 12 of the MET core 11 is a free-running counter driven by the on-board crystal oscillator 16. The first counter 12 is a sub-seconds counter and keeps track of time over scales of less than one second. The second counter 14 is a seconds counter, which tracks time on larger timescales. The first counter 12 is always reset to zero at the start of a one-second boundary at which point the seconds counter 14 is incremented, as illustrated in FIG. 3. The 1.x output signal 30 is also activated at the start of the one-second boundary and is de-activated after the sub-seconds counter 12 has exceeded a 1.x Pulse Width value.

The one-second boundary is in important feature of the MET core 11. The 1.x output signal (or pulse signal) 30 is also triggered on the one-second boundary. Both the first and second counters 12, 14 use fully synchronous logic design and both events occur simultaneously on the same clock edge, and therefore this is an atomic operation. The fully synchronous logic design also ensures that the only sources of uncertainty or error are oscillator uncertainty and radiation-induced effects.

Each of the first and second counters 12, 14 of the MET core 11 according to the exemplary embodiment is a synchronous counter known in the art and using register-type circuits such as a flip-flop, wherein all state bits change under control of a single clock. In synchronous counters, the clock inputs of all the flip-flops are connected together and are triggered by the input pulses. Thus, all the flip-flops change state simultaneously (in parallel). Each of the first and second counters 12, 14 according to the exemplary embodiment is a 4-bit synchronous counter. Synchronous counters can also be implemented with hardware finite-state machines, which are more complex but allow for smoother, more stable transitions.

The one-second boundary can be triggered in two ways: the first is when the sub-seconds counter 12 reaches a freewheel limit, and the second is from an XPPS rising edge pulse. The freewheel limit cannot be disabled and will always trigger the one-second boundary. This is taken into consideration when setting the freewheel limit.

The XPPS source 18 only triggers a one-second boundary if all three of these conditions are met: 1) the sub-second count must be greater than a blackout limit, 2) a XPPS synchronization must be enabled for that input, and 3) a rising edge must be detected on the given XPPS input. A XPPS pulse that does not trigger a one-second boundary is referred to as a "rogue" XPPS event. The XPPS pulse that does trigger a one-second boundary is referred to as a "valid" XPPS event.

The MET core 11 is configured to measure the time between the XPPS pulses as well as the offset between the XPPS signals $19_1$, $19_2$ and the 1.x output signal 30, and report those in a 1PPS count register 22, a 1PPS offset register 24, and a FLAGS register 26. This information can be used to initially synchronize a local seconds boundary to an external source (i.e., the XPPS source 18). The term "offset" in computer engineering usually denotes a number of address locations added to a base address in order to get to a specific absolute address.

As illustrated in FIG. 2, the XPPS source 18 is operably connected to the first counter 12 (i.e., the sub-seconds counter) through a metastability filter unit 20, and a synchronization logic 40. In turn, the synchronization logic 40 is operably connected to a blackout (or "Blackout Limit") register 41, a "Freewheel Limit" register 42, a mode register 43 and a Seconds Jam register 44. The "Blackout Limit" register 41 is configured to set a minimum limit when the 1PPS input pulse is considered valid. When the one-second boundary is triggered, the first counter 12 is reset to zero and the second counter 14 is either incremented or updated to match the Seconds Jam register 44.

The metastability filter unit 20 includes two metastability filters $20_1$ and $20_2$. Each of the XPPS inputs $19_1$ and $19_2$ passes through a corresponding one of the two metastability filters $20_1$ and $20_2$ and exits the metastability filter unit 20 as a single XPPS input signal 19. In other words, each of the XPPS inputs $19_1$ and $19_2$ is supplied to the first counter 12 after passing through a corresponding one of the two metastability filters $20_1$ and $20_2$, and the synchronization logic 40. In turn, the on-board crystal oscillator 16 is directly connected to each of the first counter 12 (i.e., the sub-seconds counter) and the second counter 14 (i.e., the seconds counter), and each of the sub-seconds counter 12 and the seconds counter 14 receives XO input signals 17$_1$ and 17$_2$ from the on-board crystal oscillator 16.

MET unit 10 of the exemplary embodiment further comprises a processor system bus interface 34 including a plurality of registers including status registers 36, shadow registers 37, a control register logic 38 and an interrupt logic 39, as best shown in FIG. 2. The term "status register" is known in the art as a collection of status flag bits for a processor. The status register is a hardware register that contains information about the state of the processor. Individual bits are implicitly or explicitly read and/or written by the machine code instructions executing on the processor. The status register lets an instruction take action contingent on the outcome of a previous instruction. Typically, flags in the status register are modified as effects of arithmetic and bit manipulation operations. Moreover, the XPPS synchronization is enabled via the status register 26.

The 1.x output signal 30 generated by the MET core 11 passes through a conditioning circuit 28. The conditioning circuit 28 processes an output signal from the first and second counters 12, 14 to generate the 1.x output signal suitable for the next stage of operation.

It is often desirable to synchronize the output of the MET core 11 to the XPPS inputs 19$_1$, 19$_2$. The MET core 11 provides features to handle this automatically and gracefully. This method is known as "hard" synchronization. In the exemplary embodiment, the XPPS inputs 19$_1$, 19$_2$ serve as primary triggers for the one-second boundaries, while the freewheel limit serves as a backup during initialization or during an XPPS outage.

A method for configuring a hard XPPS synchronization is as follows. Following a power up or reset, the XPPS signal will most likely be far out of phase from the one second boundaries of the MET core 11. This would cause it to fall within a blackout window as shown in FIG. 3. The blackout window exists because in most real-time systems, it can cause system instability if the processor sees a second that is, in actuality, significantly shorter or longer than one second. The offset register 22 determines how far apart the two boundaries are and the PPS count register 24 determines the period of the XPPS signal. This information is useful to plan the synchronization activity.

To synchronize the XPPS source 18, first synchronization is enabled to one of the XPPS signals using the status registers 36. Then the one-second boundaries of the MET core 11 are drifted toward an XPPS pulse by adjusting the freewheel limit slightly higher or lower to achieve an acceptable drift rate. The blackout limit is set lower than the freewheel limit, with enough margin to ensure the XPPS pulse can be captured in spite of some clock jitter or other variability. An interrupt mask can also be set to alert a processor system bus interface 34 (best shown in FIG. 2) once synchronization has been achieved.

The term "interrupt mask" is known in the art as a bit that is turned on and off by the program. An internal switch setting controls whether an interrupt can be processed or not. To mask an interrupt is to disable it, while to unmask an interrupt is to enable it. Processors typically have an internal interrupt mask register which allows selective enabling and disabling of hardware interrupts. Each interrupt signal is associated with a bit in the mask register. On some systems, the interrupt is enabled when the bit is set and disabled when the bit is clear, while on others, a set bit disables the interrupt. When the interrupt is disabled, the associated interrupt signal will be ignored by the processor. Signals which are affected by the mask are called maskable interrupts.

Figure 4:
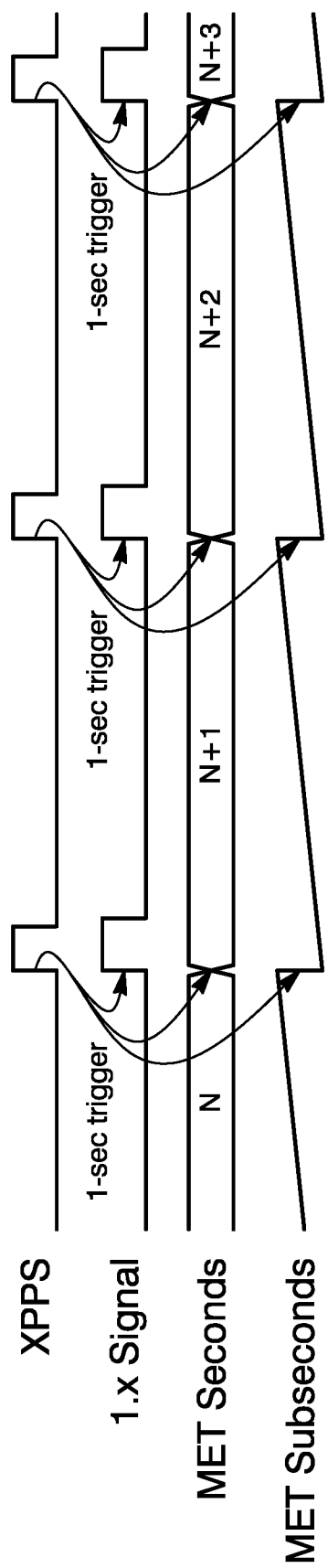
FIG. 4 is a timing diagram illustrating a nominal operating scenario in which the MET unit is synchronized to a XPPS source.

After some period of time, the MET output will drift until it is in synch with the XPPS signal as shown in FIG. 4. Once this happens, the freewheel limit needs to be set slightly higher than the expected period of one second with enough margin to tolerate clock jitter or drift. Likewise, the blackout limit is set slightly slower than the expected period of one second. This assures that the XPPS source 18 will always be the cause of a one-second roll-over, unless it either disappears or drifts significantly. The MET core 11 will automatically go into freewheel mode in the event that the XPPS signal goes off-nominal. The interrupt mask can also be set to alert the processor system bus interface 34 of this and various other off-nominal conditions.

In some applications, it may be desirable to offer more control to a software application for the sake of synchronizing time to another system. This method is known as "soft" synchronization. Soft synchronization is achieved by using the freewheel limit as the primary and only mechanism for triggering one-second boundaries. Such an application monitors the 1PPS offset register 22 and the 1PPS count register 24 on a once-per-second basis, then adjusts the freewheel limit to account for any oscillator drift. The interrupt mask can be configured to trigger this monitoring as desired. In such an application, the XPPS synchronization remains disabled at all times (the default condition).

Alternatively, the MET core 11 may also be used to track time in the absence of the XPPS signals 19$_1$, 19$_2$. This is useful if the XPPSs have disappeared or become unpredictable or if the MET unit 10 is designed without the XPPS source 18. As in the case of soft synchronization, the freewheel limit serves as the primary and only mechanism for triggering the one-second boundaries. Therefore, the length of the one-second boundary can be controlled by adjusting the freewheel limit. If a measure of clock drift can be made either at a ground station or from some other system, the MET unit 10 can be adjusted to compensate using the freewheel limit. The interrupt mask can also be set to alert the processor in the event that the XPPS signals 19$_1$, 19$_2$ has recovered. In addition, it may be desirable to disable synchronization via the status register or by setting the blackout limit higher than the freewheel limit. Thus, the MET core 11 may be used in a mode where no 1PPS input is provided and the MET unit 10 simply maintains time based on the on-board oscillator 16 and the freewheel limit.

The AHB bus 3$_2$ accepts 32-byte data transfers and an 8-bit address. It supports both single and variable-length burst transfer types. Fixed length burst transfers are not supported. Additionally, only Double Word (32-bit) (Dword) data transfers are accepted. Table 1 below is a list of registers in the MET core 11 that can be accessed via the AHB bus interface.

TABLE 1

| Register | Address |
| --- | --- |
| Time Seconds | 0x00100000 |
| Time Subseconds | 0x00100004 |
| Status | 0x00100008 |
| Interrupt Vector | 0x0010000C |
| Interrupt Mask | 0x00100010 |
| Last 1PPS Offset 1 | 0x00100014 |
| Last 1PPS Count 1 | 0x00100018 |
| Last 1PPS Offset 2 | 0x0010001C |
| Last 1PPS Count 2 | 0x00100020 |
| Freewheel Limit | 0x00100024 |
| Blackout Limit | 0x00100028 |
| 1.x pulse width | 0x0010002C |
| Jam Seconds | 0x00100030 |

TABLE 1-continued

| Register | Address |
|---|---|
| Capture 1 Seconds | 0x00100034 |
| Capture 1 Subseconds | 0x00100038 |
| Capture 2 Seconds | 0x0010003C |
| Capture 2 Subseconds | 0x00100040 |
| Capture 3 Seconds | 0x00100044 |
| Capture 3 Subseconds | 0x00100048 |
| Capture 4 Seconds | 0x0010004C |
| Capture 4 Subseconds | 0x00100050 |
| Capture 5 Seconds | 0x00100054 |
| Capture 5 Subseconds | 0x00100058 |
| Capture 6 Seconds | 0x0010005C |
| Capture 6 Subseconds | 0x00100060 |
| Capture 7 Seconds | 0x00100064 |
| Capture 7 Subseconds | 0x00100068 |
| Capture 8 Seconds | 0x0010006C |
| Capture 8 Subseconds | 0x00100070 |

The register "Time Seconds" (address: 0x00100000), when read returns the current value of the seconds portion of the MET timer. Reading this register causes the sub-seconds value to be latched into its register for reading to assure that the two values reflect the same moment in time. Therefore, this register should always be read prior to reading the "Time Sub-seconds" register. This can be done as a burst read or as two individual reads. Writing to this register has no effect.

| MET (seconds) |
|---|
| R (x00000000) |

When read, the register "Time Sub-seconds" (address: 0x00100004) returns the value of the sub-seconds that was latched when the seconds register was last read. Therefore, the seconds register should always be read prior to reading this register. This can be done as a burst read or as two individual reads. Writing to this register has no effect. The sub-seconds count is in units of clock counts. It can be converted to seconds by multiplying it by the clock period, which in the preferred embodiment is 20 ns. This register can never be greater than the freewheel limit. It is important to note that converting this to units of time in this way has the possibility to yield a number that is greater than one second. This should be taken into consideration when combining the seconds and sub-seconds registers into a single floating-point number.

The register "Status" (address: 0x00100008) provides general control and status bits, including interrupt flags. It serves, in part, as the interrupt status register, therefore, reading it will clear all pending interrupts. The status register is composed as follows:

| Reserved |
|---|
| N/A (x00) |

| Reserved |
|---|
| N/A (x00) |

| 1PPS Mask |
|---|
| R/W (xFF) |

| Reserved | EJAM | Reserved | XPPS2 | XPPS1 |
|---|---|---|---|---|
| N/A (b000) | R/W (0) | N/A (b00) | R/W (0) | R/W (0) | wherein:
1PPS Mask (R/W)—Individually enables each of eight 1PPS output signals;
EJAM—Enable Seconds Jam (R/W)—Enables the Seconds Jam Register; and
SPPS—1PPS Synchronization (R/W)—Enables synchronization to the 1PPS pulses.

The register "Interrupt Vector" (address: 0x0010000C) is used for reading and clearing interrupt flags. Writing a '0' to any of the interrupt flag locations will clear the respective interrupt. Writing a '1' to any bit location in this register will be ignored. This register works in conjunction with the "Interrupt Mask" register to produce the interrupt signal. These flags are activated by their respective triggers regardless of the mask setting. The mask setting controls which events will toggle the interrupt signal.

| Reserved |
|---|
| N/A (x00) |

| Reserved |
|---|
| N/A (x00) |

| CAP8 | CAP7 | CAP6 | CAP5 | CAP4 | CAP3 | CAP2 | CAP1 |
|---|---|---|---|---|---|---|---|
| R(0) | R(0) | R(0) | R(0) | R(0) | R(0) | R(0) | R(0) |

| Reserved | ROG2 | ROG1 | PPS2 | PPS1 | FWL | 1.X |
|---|---|---|---|---|---|---|
| N/A (x0) | R(0) | R(0) | R(0) | R(0) | R(0) | R(0) | wherein:
CAP—Capture Event Interrupt (R/W)—Indicates that a capture event occurred;
ROG—Rogue 1PPS Interrupt (R/W)—Indicates that a Rogue 1PPS event occurred;
PPS—Valid 1PPS Interrupt (R/W)—Indicates that a valid 1PPS event occurred;
FWL—Freewheel Interrupt (R/W)—Indicates that a second rolled over by reaching the freewheel limit; and
1X-1.X Boundary Interrupt (R/W)—Indicates that the 1.X boundary rolled over either due to a valid 1PPS or a freewheel limit event.

The register "Interrupt Mask" (address: 0x00100010) is used for enabling interrupt sources. By default, all interrupts are disabled. By setting bits in this register, each interrupt source can be enabled independently. Status flags will continue to behave in the same way regardless of the interrupt mask setting.

| Reserved |
|---|
| N/A (x00) |

| Reserved |
|---|
| N/A (x00) |

| ICAP8 | ICAP7 | ICAP6 | ICAP5 | ICAP4 | ICAP3 | ICAP2 | ICAP1 |
|---|---|---|---|---|---|---|---|
| R/W (0) | R/W (0) | R/W (0) | R/W (0) | R/W (0) | R/W (0) | R/W (0) | R/W (0) |

| Reserved | IROG2 | IROG1 | IPPS2 | IPPS1 | IFWL | I1.X |
|---|---|---|---|---|---|---|
| N/A (x0) | R/W (0) | R/W (0) | R/W (0) | R/W (0) | R/W (0) | R/W (0) | wherein:

ICAP—Capture Event Interrupt Enables (R/W)—Input capture registers;

IROG—Rogue 1PPS Interrupt Enables (R/W)—Rogue 1PPS event;

IPPS—Valid 1PPS Interrupt Enables (R/W)—Valid 1PPS event;

IFWL—Freewheel Interrupt Enable (R/W)—Freewheel limit event; and

I1.X—1.X Boundary Interrupt Enable (R/W)—1.X boundary rolled over either due to a valid 1PPS or a freewheel limit event.

The register "Last 1PPS Offset" (addresses: 0x00100014 and 0x0010001C) always contains the value of the sub-seconds counter that was latched when the 1PPS last arrived. There are two copies of this register, each acting with respect to one of the two 1PPS inputs $19_1$ and $19_2$. This register is in units of clock counts. It can be converted to seconds by multiplying it by the clock period, which in the preferred embodiment is 20 ns.

| Res. | Last 1pps Offset Value |
|---|---|
| N/A (b00) | R (x00000000) |

The register "Last 1PPS Count" (addresses: 0x00100018 and 0x00100020) always contains the count between the last two 1PPS pulses. The only exception is the first 1PPS to arrive after a reset, in which case it will contain the count from the reset to the first 1PPS pulse. There are two copies of this register each acting with respect to one of the two 1PPS inputs $19_1$ and $19_2$. This register is in units of clock counts. It can be converted to seconds by multiplying it by the clock period, which in the preferred embodiment is 20 ns.

| Res. | Last 1PPS Count Value |
|---|---|
| N/A (b00) | R (x00000000) |

The "Freewheel Limit" register 42 (address: 0x00100024) limits how long the MET core waits for a 1PPS pulse before it freewheels. This register is in units of clock counts. It can be converted to seconds by multiplying it by the clock period, which in the preferred embodiment is 20 ns.

| Res. | Freewheel Limit |
|---|---|
| N/A (b00) | R/W (d50000000) |

The "Blackout Limit" register 41 (address: 0x00100028) sets the minimum limit when the 1PPS pulse is considered valid. This is in units of clock period counts. 1PPS pulses that arrive before this pulse will be considered "Rogue" and will generate a status ag and a mask-able interrupt. This register is in units of clock counts. It can be converted to seconds by multiplying it by the clock period, which in the preferred embodiment is 20 ns.

| Res. | USO Valid Boundary |
|---|---|
| N/A (b00) | R/W (d50000000) |

A "Pulse Width" register 46 (address: 0x0010002C) sets the pulse width of the 1.x output pulse. This is in units of clock period counts. This register is in units of clock counts. It can be converted to seconds by multiplying it by the clock period, which in the preferred embodiment is 20 ns.

| Res. | 1.x Pulse Width |
|---|---|
| N/A (b00) | R/W (d50000000) |

The "Jam Seconds" register 44 (address: 0x00100030) is used to jam a new seconds value into the MET core 11. A write to this register will become the seconds value for the MET core 11 at the start of the next one-second boundary. If this register is written multiple times within a single one-second boundary, the last value will override any prior values. This function must first be enabled via the Status Register, otherwise, it will be ignored. The Jam Enable bit in the status register will remain active after the Jam Register is used. Therefore, it is recommended to clear the Jam Enable bit when no further Jam operations are anticipated. If no write to this register has occurred within a one second boundary, then the seconds value will simply increment as usual, regardless of whether the jam enable bit is set.

| New MET Seconds Value |
|---|
| R/W (x00000000) |

The MET unit 10 of the exemplary embodiment further comprises a capture register unit 32 operably connected to both the first and second counters 12, 14, as best shown in FIG. 2. The MET unit 10 includes sixteen capture registers. Specifically, the capture registers unit 32 includes eight identical registers "Capture Seconds" (address 1: 0x00100034, address 2: 0x0010003C, address 3: 0x00100044, address 4: 0x0010004C, address 5: 0x00100054, address 6: 0x0010005C, address 7: 0x00100064, address 8: 0x0010006C), each with a seconds and sub-seconds component. When read, each of these registers will return the seconds value of the MET core 11 that was most recently latched by the capture input. Reading each of these registers causes the sub-seconds capture value to be latched in order to ensure that the two values reflect the same capture event. Therefore, the seconds capture value is read before the corresponding sub-seconds capture value. This can be done as a burst read or as individual reads. Writing to each of these registers has no effect.

| Capture Time (seconds) |
| --- |
| R (x00000000) |

Moreover, the capture register unit 32 further includes eight identical registers "Capture Sub-seconds" (address 1: 0x00100038, address 2: 0x00100040, address 3: 0x00100048, address 4: 0x00100050, address 5: 0x00100058, address 6: 0x00100060, address 7: 0x00100068, address 8: 0x00100070) each with a seconds and sub-seconds component. When read, each of these registers returns the sub-seconds value that was most recently latched by the capture input. The capture sub-seconds value is latched when the corresponding capture seconds value is read. This assures that the two values reflect the same capture event. Therefore, the seconds capture value is read before the corresponding sub-seconds capture value. This can be done as a burst read or as individual reads. Each of these registers is in units of clock counts. It can be converted to seconds by multiplying it by the clock period, which in the preferred embodiment is 20 ns. Writing to this register has no effect.

| Capture Time (seconds) |
| --- |
| R (x00000000) |

Capture inputs for the MET core 11 are assigned to signals in the FPGA 1 according to Table 2 below.

TABLE 2

| Capture # | Assignment |
| --- | --- |
| 1 | 1PPS A |
| 2 | 1PPS B |
| 3 | VC0 SCOM A |
| 4 | VC0 SCOM B |
| 5 | Verification Input |
| 6 | Unassigned |
| 7 | Unassigned |
| 8 | Unassigned |

1.x Hz output signals 30 of the MET core 11 are assigned to pins on the FPGA 1 according to Table 3 below. The bit position refers to the mask position in the status register 26, where 0 is the Least Significant Bit (LSB) and 7 is the Most Significant Bit (MSB).

TABLE 3

| Bit Position # | Assignment |
| --- | --- |
| 1 | FPGA_RS422_1XHZ_A_TX1 |
| 2 | FPGA_RS422_1XHZ_A_TX2 |
| 3 | FPGA_RS422_1XHZ_A_TX3 |

TABLE 3-continued

| Bit Position # | Assignment |
| --- | --- |
| 4 | FPGA_RS422_1XHZ_A_TX1 |
| 5 | FPGA_RS422_1XHZ_A_TX2 |
| 6 | FPGA_RS422_1XHZ_A_TX3 |
| 7 | Unassigned |
| 8 | Unassigned |

Therefore, the present invention provides a novel mission elapsed time (MET) unit with a MET core including a sub-seconds counter keeping track of time over scales of less than one second, and a seconds counter keeping track of time over scales of larger than one second.

The foregoing description of the exemplary embodiment of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method for synchronization of an output of a mission elapsed time (MET) core to an external pulse per second (XPPS) input signal, wherein the MET core includes a sub-seconds counter keeping track of time over scales of less than one second and a seconds counter keeping track of time over scales of larger than one second, the sub-seconds counter operably connected to the seconds counter, the XPPS input signal generated by a XPPS source operably connected to the MET core, the method comprising the steps of:

powering up or resetting the XPPS input signal;
determining how far apart are two one-second boundaries of the MET core;
determining a period of the XPPS input signal;
enabling first synchronization to the XPPS input signal using a status register;
adjusting a freewheel limit higher or lower to achieve an acceptable drift rate of the one-second boundaries of the MET core toward the XPPS input signal; and
setting a blackout limit lower than the freewheel limit with enough margin to ensure that the XPPS pulse is captured.

2. The method for synchronization as defined in claim 1, further comprising the step of setting the freewheel limit higher than an expected period of one second with enough margin to tolerate clock jitter or drift when the output of the MET core is in synch with the XPPS input signal.

* * * * *